Jan. 16, 1968
R. E. BARTLETT
3,364,038
PROCESS AND APPARATUS FOR PASTEURIZING AND
CLARIFYING, SEPARATING AND/OR
HOMOGENIZING MILK
Filed Feb. 10, 1965
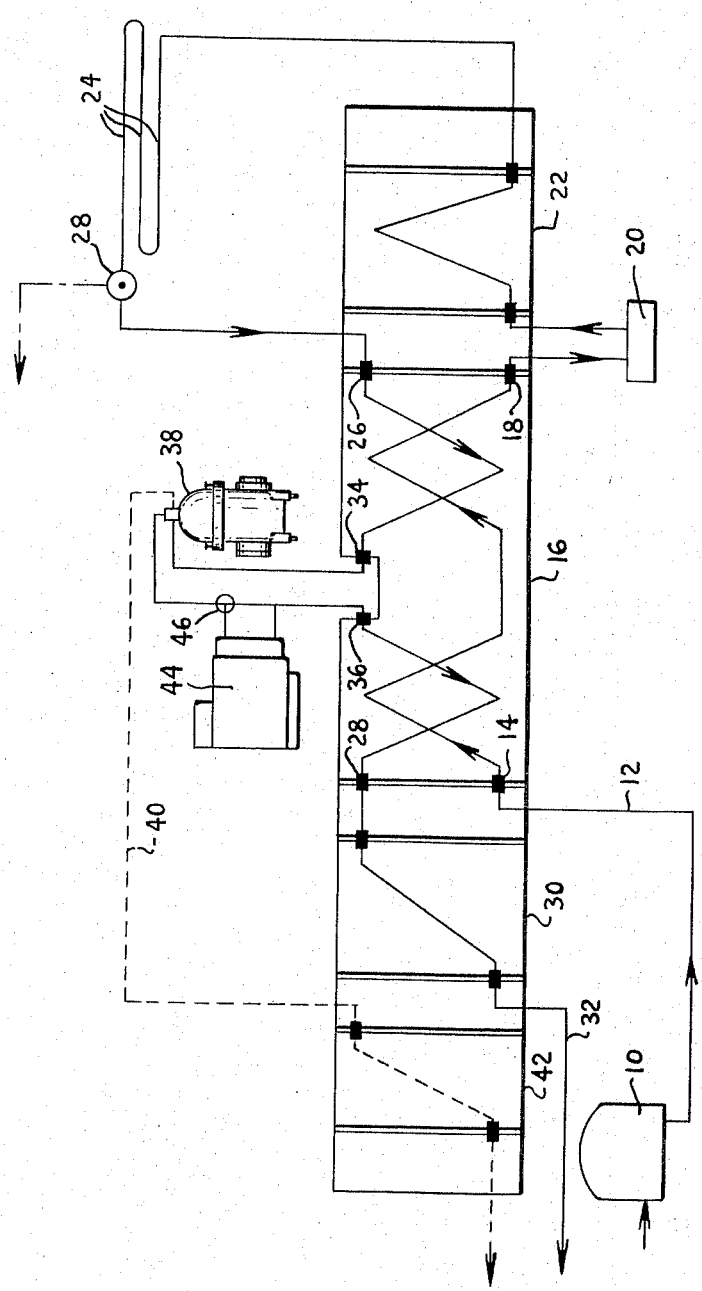
INVENTOR.
ROBERT E. BARTLETT
BY
*Steward + Steward*
*his* ATTORNEYS

United States Patent Office 3,364,038
Patented Jan. 16, 1968

3,364,038
PROCESS AND APPARATUS FOR PASTEURIZING AND CLARIFYING, SEPARATING AND/OR HOMOGENIZING MILK
Robert E. Bartlett, Andover, Mass., assignor to Manton-Gaulin Sales Company, Inc., Everett, Mass., a corporation of Massachusetts
Filed Feb. 10, 1965, Ser. No. 431,543
8 Claims. (Cl. 99—212)

The invention herein disclosed pertains to a system for processing milk and cream. The system is designed particularly to provide improvement in the manner of clarifying, separating and/or homogenizing milk in conjunction with pasteurization.

The basic steps in any milk processing system today include, broadly, clarification of the raw milk to remove unwanted body cells, separation of some or all of the cream depending upon the ultimate product desired, pasteurization of the milk and/or cream and, in many instances, homogenization of the milk. The process while appearing to be simple and straightforward involves many conflicting considerations as to choice or selection of processing steps and the order in which they are performed if a system of maximum flexibility is to be obtained. This is particularly true if different products are to be produced at different times during an operation period without shut-down of the system in changing from one type to another.

One of the principal objectives of the present invention therefore is to provide greater flexibility of processing control and product delivered. It is a further object to achieve these ends in a manner which is compatible with standard high-temperature, short-time pasteurizing systems which are used predominately today in the dairy industry. By means of the system here disclosed, raw milk may be selectively processed to produce one of the following products, namely:

(a) Cold, clarified, pasteurized, homogenized milk;
(b) Cold, clarified, pasteurized, regular (cream-line) milk;
(c) Cold, clarified, pasteurized, skim milk, in addition to cold, pasteurized light or heavy cream.

The process here disclosed differs from those previously used in that an operator can switch at will from any clarified product to any separated product and back again without the usual necessity in prior systems for physically separating any piping joint in the system. This can be accomplished at any time during a day's production run and as many times as required during that run.

Among other advantages flowing from the improved system is the ability to meet and adhere to guarantees of butter-fat content in processed milk within much closer tolerances without difficulty. Improvement in the product itself is obtained by way of increased shelf-life for processed milk and/or cream. There is also effected a substantial reduction in the amount of processing equipment needed, and the handling capacity of that equipment for a given maximum daily output.

Other advantages and objects of the invention will become apparent as the description herein proceeds in connection with a preferred embodiment of the novel milk processing system illustrated diagrammatically in the accompanying drawing.

A brief review of the conventional steps in processing milk will be useful as a basis for describing the improvements of the present invention. Raw milk at a normal storage temperature of 38° to 40° F. is run from a storage or collection tank through a clarifier to eliminate body cells and other unwanted solid matter in the milk to the balance tank of the pasteurizer. At the same time separation of some or all of the cream may be effected depending on the products desired. This separated cream is either stored, again under refrigeration, for subsequent pasteurization or is processed, i.e. pasteurized, concurrently with the milk. If the latter course is followed, this requires separate pasteurizing equipment thus duplicating in large part the equipment used for the milk. On the other hand, if the cream is stored until all of the milk has been processed so that the cream can then be run through the same pasteurizing equipment used for the milk, the problems of adequate storage capacity, additional labor in handling, as well as refrigeration are then encountered. Whichever system is used upon completion of the clarification and separation operation, the raw milk is moved by suction through a unit, generally referred to as the "regenerator" which is a heat exchanger. This preheats the raw milk prior to its then being fed to a heater which supplies additional heat necessary to raise the temperature to that required for pasteurization. In the typical high-temperature, short-time (HTST) process, the pasteurizing temperature is between 163° and 170° F. Milk at this temperature is fed at a timed rate of flow through a holding tube for a period sufficient to insure destruction of bacteria. The hot, pasteurized milk then flows back through the regenerator on the opposite side of the plates or tubes from the incoming raw milk in heat-exchange relation thereto. Some of the heat of the pasteurized milk is thus drawn off to pre-heat the incoming raw milk, while the pasteurized milk is simultaneously cooled. The pasteurized milk must be further cooled by additional cooling or refrigerating equipment to reduce its temperature to an appropriate storage or bottling temperature, again about 38° to 40° F.

If homogenization of the milk is required, this is done following the clarification-separation step. There is however a problem in selecting a suitable point in the system for effecting the homogenizing operation. In order to achieve an effectively permanent or stable emulsification of the cream, a minimum temperature of about 140° F. in the milk is necessary. In the conventional process, the milk upon leaving the raw regenerator and prior to entering the heater ordinarily has a temperature of this order and this, therefore, seemingly represents a logical point for inserting the homogenizer and is accordingly often selected. Concurrent separation at this temperature of raw, unpasteurized cream, however, produces cream at an elevated temperature which, in order to avoid spoilage, must either be immediately pasteurized, requiring extra equipment, or else cooled down and stored for later re-heating to permit pasteurization in the same equipment used for the milk. The only other points in the conventional HTST system readily available for insertion of the clarifier-separator and homogenizer combination are found after the pasteurizing holding tube (before re-entry into the regenerator) and after the regenerator prior to the cooler. At the latter point, the milk has a temperature of 60° to 70° F. and, as already indicated, effective homogenization cannot be obtained at such low temperature. The temperature of the milk after leaving the pasteurizer and before entry into the regenerator is rather high, being around 163° F. Insertion of the homogenizer at this point has the effect of increasing the time during which the milk is maintained at pasteurizing temperatures. The temperature-time relation is a very critical one, particularly at such elevated temperatures, and any upsetting of this relationship as by the addition of another processing operation at this point adversely effects both the milk products and the cream obtained through separation (poor body). This temperature (approximately 163° F.) has also proven too high for separation, as a very poor quality of cream results.

These problems with the conventional system have existed for a long time and various attempts have been made to obtain a practical working balance between the advantages and disadvantages of any one particular arrangement in the system. The present invention provides a unique solution to the conflicting requirements noted above and has led to some surprising and quite unobvious and unexpected improvements in the products obtained.

In accordance with the present invention, and with reference to the accompanying drawing comprising a schematic flow diagram, the improved system makes use of the typical HTST pasteurization process and equipment and thus avoids expensive change-over in existing equipment. The modified system includes the usual balance tank 10 in which the incoming raw milk is held prior to processing and in which it is generally kept at a temperature of approximately 40° F. The raw milk is then pulled by suction, as by pump 20, through piping 12 to inlet 14 of regenerator 16. The milk then passes through the regenerator, being confined to one side of heat exchange plates or tubes (not shown) of which the regenerator is constructed, emerging finally at outlet 18. In the course of this pass, the milk is preheated by heat transfer from pasteurized milk returned through the regenerator, as appears more fully hereinafter. The preheated raw milk is at a temperature of approximately 140° F. and it passes immediately to timing or volumetric suction pump 20. This pump measures the flow through the subsequent pasteurization step in order to effect a "legal hold" of the milk at the proper temperature to meet pasteurization requirements set up by applicable statute. The milk passes from pump 20 to heater 22 which raises the milk to a temperature of 163° to 170° F. While at this temperature the milk passes to holding tube 24 and back to the pasteurized milk inlet 26 of regenerator 16. The loop composed of heater 22 and the ducting including holding tube 24 to inlet 26 of the regenerator is critical as to its length, inasmuch as this affects the length of time during which the milk is held at the high temperature. Too long a hold at such temperature will adversely affect the flavor of the milk, as well as its physical properties. On the other hand, insufficient hold at the required temperature will not fully pasteurize the milk and such milk may not thereafter be legally sold. Normally also the legal requirements of milk pasteurizing systems require the inclusion of a flow diverter valve 28 in the flowline immediately following the holding tube 24. Such valve is automatically actuated to divert all of the milk to discharge in case the pasteurizing temperature drops below the legally required minimum.

It will be noted that in the disclosed system, there is no clarification or separation of the milk before pasteurization; i.e., the whole milk is pasteurized.

The pasteurized whole milk entering inlet 26 of regenerator 16 then flows in counter-current fashion through the regenerator to outlet 28 on the opposite side of the heat exchange plates in the regenerator from the incoming raw milk, and then through a cooler 30 which reduces the temperature of the milk to around 38° F. at outlet 32. From this point the milk is ducted to a bottling operation or such other disposition of it as is desired.

In the normal, conventional HTST system, the return flow of the pasteurized milk from inlet 26 to outlet 28 of regenerator 16 is continuous. In the system here disclosed, however, the regenerator is modified to interrupt the flow and to cause it to be temporarily diverted during the return pass before continuing through the balance of the system. The usual regenerator is accordingly modified to provide outlet and inlet taps 34, 36, respectively, at a predetermined point in the return (pasteurized) side of the regenerator, between the main inlet 26 and outlet 28. This point of diversion is selected such that the temperature of the milk is in the range of 135°–145° F. The diverted pasteurized whole milk emerging from outlet 34 is then passed to a clarifier-separator 38 where cream is removed and run through suitable ducting 40 to a separate cooler 42 which serves to reduce the temperature of the cream from approximately 140° F. down to 40° F., the normal storage temperature.

The milk from clarifier-separator 38 can then be passed through a homogenizer 44 and returned to inlet 36 of the regenerator so that the milk which is then homogenized continues on through the system in the conventional manner. If homogenization of the milk is not desired, homogenizer 44 may be by-passed by means of a selectively positionable three-way valve 46 in the ducting between separator 38 and homogenizer 44, thus returning separated but unhomogenized milk directly from the separator to the inlet 36 of the regenerator. Using the same methods described above unseparated homogenized milk, or cream-line regular (unhomogenized) milk is obtained merely by a change of control position on the clarifier-separator.

Homogenizer 44 may be of any standard type but preferably is the type shown in the U.S. Patent Nos. 2,832,573 and 2,852,237. Similarly the clarifier-separator may be of any standard type but a number of advantages are obtained by using what is generally referred to as a "liquid seal" type such as that disclosed in U.S. Patent No. 3,079,133. Since this type of separator incorporates its own built-in pumps, the usual timing pump 20 of the system will provide all of the external pumping capacity that is required. A hermetic seal separator of the type shown in U.S. Patent No. 2,667,302 may also be used upon observing certain precautions as will be explained presently. But the latter type requires a rather substantial input pressure in the system, on the order of about 25 to 50 p.s.i., in order to overcome the internal pressure drop inherent in that type of a machine. Thus the use of the liquid seal separator results in substantial lowering of the pressure throughout a large part of the system. This is definitely advantageous since cream quality is adversely affected by pressure. A hermetic seal machine would also require an additional external cream pump.

Since all clarification and separation in the novel system here disclosed takes place after pasteurization, but at a temperature at which most bacteria are still destroyed, it is possible to shift from one type of operation to another at any time without danger. That is, to shift from processing of whole milk of specified cream content to skim milk from which substantially all of the cream has been separated, and back again to whole milk. This may readily be done at any time without physically separating any piping connection in order to effect proper sterilization of any part of the system. This arrangement also results in eliminating all air from the system and prevents post-pasteurization bacterial contamination, a problem encountered in the conventional system by reason of the need to change piping by hand after the system has been sterilized at the start of a day's operation.

By means of the system here disclosed, an unexpected improvement is obtained in respect to the ability of a dairy to deliver skim milk meeting guarantees of 1/10 of 1% in butterfat content, which means a substantial savings to the dairy operator. Owing to the hot separation and the immediate quick chilling, the bacteria count of the cream is materially lowered, resulting in greater shelf-life for the cream. It has been found further that this manner of producing cream has resulted in substantial elimination of foaming which occurs in conventional systems, so that the cream can be bottled immediately upon cooling without any required settling period. Still another advantage is that there is noticeably improved "whipability" of the product; that is, the process provides a cream which will remain whipped for a longer time without watering or wheying-off.

As mentioned above, a liquid seal separator of the type defined is preferred for the reasons given, but it will be understood that a conventional hermetic seal separator can also be used in the system. The latter type of separator, however, requires special by-passing and reserve supply connections in order to insure against the possibility of the separator running dry momentarily. Should that occur, the seals in the machine can be damaged since the presence of a fluid such as the milk in the separator is relied upon to provide adequate lubrication and cooling.

Selection of the point at which the separator and homogenizer are tapped into the pasteurized milk side of the regenerator is critical in order to achieve the optimum benefits of the invention. In general, the preferred minimum temperature of the milk should be 140° F. or slightly higher, with a maximum however of about 145° F. Substantial advantages of the system can still be achieved if the milk at the take-off point on the regenerator is at a temperature of at least 135° F. The end use of the milk will determine the temperature actually to be selected in practice. For example, if skim milk is the desired product for subsequent processing into cottage cheese, a higher temperature will result in reduced yields. Consequently the lower temperatures within the ranges defined are preferred for this purpose. If, on the other hand, the product desired is regular homogenized milk, more effective homogenization is obtained, as already mentioned, if the milk temperature at the time of homogenization is a minimum of 140° F.

What is claimed is:

1. In a process for pasteurizing and separating milk fluids which comprises passing raw milk through a regenerator to preheat the milk, and then through a heater to raise the temperature to the pasteurizing point, holding it at such temperature for a pre-determined time, returning the pasteurized milk to the regenerator to effect heat exchange with the incoming milk and reduce the temperature of the pasteurized milk, and finally passing the pasteurized milk through a cooler, the improvement which comprises:
   (a) diverting the pasteurized milk temporarily during its return pass through the regenerator,
   (b) passing the diverted milk through a separator-clarifier to effect separation or clarification,
   (c) returning this milk to the regenerator for continued flow therethrough and subsequent cooling to complete the pasteurization process.

2. The process as defined in claim 1, which also includes the step of homogenizing the separated-clarified milk before returning it to the regenerator.

3. The process as defined in claim 1, wherein the milk is diverted from the regenerator at a point where its temperature is between 135° F. and 145° F.

4. The process as defined in claim 1, wherein the pasteurized milk is diverted from the regenerator at a point where its temperature is approximately 140° F.

5. The method defined in claim 1, wherein separation-clarification is effected by a liquid seal separator.

6. The method as defined in claim 1, wherein the separator-clarifier is operated to separate cream from the milk, and such separated cream is immediately passed through a cooler to cool it to a suitable storing temperature.

7. In a milk processing system for pasteurizing, clarifying and separating milk fluids which includes a regenerator for preheating incoming raw milk, a supplementary heater for raising the preheated raw milk to pasteurizing temperature for a predetermined length of time and then returning the pasteurized milk to the regenerator for countercurrent flow therethrough in heat transfer relation to the incoming raw milk, inlet and outlet connections in said regenerator for said incoming raw milk and pasteurized milk passes, respectively, and cooling means for cooling the pasteurized milk fluid to storage temperature, the improvement which comprises: providing said regenerator with outlet and inlet taps intermediate said inlet and outlet connections of the return or pasteurized milk pass, providing separator-clarifier and homogenizer means, and means for ducting the diverted milk from said outlet tap through said separator-clarifier and homogenizer means and returning it to said inlet tap of said regenerator for continued passage therethrough.

8. The milk pasteurizing system as defined in claim 7, wherein a by-pass is provided around said homogenizer to allow milk to be passed directly from the separator-clarifier to the inlet tap of said regenerator.

No references cited.

HYMAN LORD, *Primary Examiner.*

S. E. HEYMAN, *Assistant Examiner.*